United States Patent [19]

Larsen

[11] Patent Number: 5,135,668
[45] Date of Patent: Aug. 4, 1992

[54] PROCESS FOR INHIBITING CORROSION IN OIL PRODUCTION FLUIDS

[75] Inventor: Arthur L. Larsen, Bergen, Norway

[73] Assignee: Scandinavian Oilfield Chemicals A/S, Bergen, Norway

[21] Appl. No.: 653,023

[22] Filed: Feb. 8, 1991

[30] Foreign Application Priority Data

Feb. 9, 1990 [DE] Fed. Rep. of Germany ....... 4003893

[51] Int. Cl.$^5$ .................. C23F 11/12; C23F 11/14
[52] U.S. Cl. .................. 252/8.555; 252/392; 252/403; 166/902; 422/16
[58] Field of Search .............. 252/8.555, 392, 403, 252/390, 394, 401, 405, 407; 166/902; 422/16

[56] References Cited

U.S. PATENT DOCUMENTS

| | | | |
|---|---|---|---|
| 2,697,656 | 12/1954 | Stayner et al. | 252/392 X |
| 2,745,809 | 5/1956 | Cardwell | 252/8.555 |
| 3,017,354 | 1/1962 | Riggs | 252/8.554 |
| 3,054,750 | 9/1962 | Jolly | 252/8.55 |
| 3,203,904 | 8/1965 | Brown | 252/392 |
| 3,280,029 | 10/1966 | Waldmann | 252/392 X |
| 3,657,129 | 4/1972 | Obermeier | 252/392 X |
| 3,854,959 | 12/1974 | Constain et al. | 106/14 |
| 4,061,580 | 12/1977 | Jahnke | 252/8.554 |
| 4,201,678 | 5/1980 | Pye et al. | 252/8.5 A |
| 4,587,025 | 5/1986 | Horodysky et al. | 252/392 X |
| 5,013,483 | 5/1991 | Frenier et al. | 252/8.555 X |
| 5,071,574 | 12/1991 | Pou | 252/8.555 |

FOREIGN PATENT DOCUMENTS

| | | |
|---|---|---|
| 1451354 | 7/1966 | France . |
| 0234897 | 4/1986 | German Democratic Rep. . |
| 1062359 | 3/1967 | United Kingdom . |

*Primary Examiner*—John S. Maples
*Assistant Examiner*—C. Sayala
*Attorney, Agent, or Firm*—Francis C. Hand

[57] ABSTRACT

A process for inhibiting corrosion in oil production fluids resides in adding to the oil production fluids an effective amount of betaine or ampholyte of the formulas 1 or 2

$$R^1-CONH-(CH_2)_3-\overset{\oplus}{\underset{\underset{R^3}{|}}{\overset{\overset{R^2}{|}}{N}}}-CH_2-COO^{\ominus} \quad (1)$$

$$R^1-\overset{\oplus}{N}H_2-CH_2CH_2-COO^{\ominus} \quad (2)$$

wherein $R^1$ is $C_{10}$–$C_{20}$-alkyl or $C_{10}$–$C_{20}$-alkenyl, preferably $C_{14}$–$C_{18}$-aklyl or $C_{14}$–$C_{18}$-alkenyl and $R^2$ and $R^3$ are $C_1$–$C_4$-alkyl, preferably methyl.

3 Claims, No Drawings

PROCESS FOR INHIBITING CORROSION IN OIL PRODUCTION FLUIDS

DESCRIPTION

Corrosion inhibitors used in oil production offshore are highly cationic but the use of such cationic based corrosion inhibitors for offshore oil platforms are becoming less acceptable for environmental reasons. By being cationic they are attracted to metal surfaces, controlling acid type corrosion. When these cationic corrosion inhibitors find their way into the seawater, they are attracted to a particular type of algae, diatomes. These algae are a part of a food-chain for mussels.

It has been reported that a corrosion inhibitor has not been found, that does not inhibit growth of these algae, at a concentration greater than 1 ppm. The diatomes have a skeleton structure of about 80% silicon dioxide or quartz. Cationic materials, which make up most corrosion inhibitors are attracted to quartz as readily as they are to metals. Cationics used for producing corrosion inhibitors, can be quaternary amines, amine salts, ethoxilated amines, ether amins, polyamines, amido amines, essentially all nitrogen based molecules are candidates for producing corrosion inhibitors.

Due to the decreased toxic properties and the ampholytic characteristics of the ampholytes and betaines, the biodegradability is greatly increased. Thereby reducing the possibility of these products ever reaching toxic levels.

It has now been found that this problem can be overcome by using certain betaines or ampholytes as corrosion inhibitors.

Accordingly the subject matter of the instant invention is a process for inhibiting corrosion in oil production fluids which process consists in adding to the oil production fluids an effective amount of a betaine or ampholyte of the formulas 1 or 2

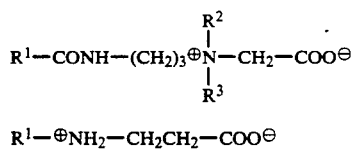
(1)

$$R^1-\oplus NH_2-CH_2CH_2-COO^\ominus \quad (2)$$

wherein $R^1$ is $C_{10}-C_{20}$-alkyl or $C_{10}-C_{20}$-alkenyl, preferably $C_{14}-C_{18}$-alkyl or $C_{14}-C_{18}$-alkenyl and $R^2$ and $R^3$ are $C_1-C_4$-alkyl, preferably methyl.

These betaines and ampholytes as described before can be used as such or they can be used upon being neutralised with acids such as, but not limited to acetic acid, adipic acid, sebacic acid, naphthenic acids, paraffinic acids, tall oil acids or free $SO_2$. They function as corrosion inhibitors in oil production fluids containing acid such as carbon dioxide as corrodent. Carbon dioxide is the most common acid in oil production fluids.

In addition these betaines and ampholytes can also be used together with other corrosion inhibitors to reduce the toxicity, preferably oxalkylated fatty amines of the formulas 3 or 4

$$R^1-NH-(C_2H_4O)_xH \quad (3)$$

$$R^1NHCH_2CH_2CH_2NH-(C_2H_4O)_xH \quad (4)$$

wherein $R^1$ is as defined above and X is a number from 5 to 15 or a compound of the formula 5

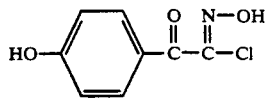
(5)

The betaine or ampholyte compound of formulas 1 and 2 or the mixtures of these compounds with the compounds of formulas 3, 4 and/or 5 are added to the oil production fluids at a rate that is effective to prevent corrosion. Under usual conditions an amount of 5 to 300, preferably 2 to 20 ppm will be sufficient.

When the betaines or ampholytes of formulas 1 and 2 are dumped to neutral or alkaline pH-water, such as seawater, they loose their cationic characteristics, and take on the characteristics of nonionic or anionic molecules. Under these conditions, they no longer function as corrosion inhibitors and they also will not inhibit the growth of the diatomes, as would be the case if they maintained their cationic characteristics.

Also the oxalkylated amines of formulas 3 and 4 do not function as cationics and therefore they loose their ability to be readily absorbed by the silicate in the diatomes. The same is with the p-hydroxy-benzoic acid derivative of formula 5 which hydrolyses at a pH greater than 7.5 forming non-toxic benzoates.

Formulations for use on the basis of the above described betaines and their mixtures with compounds of formulas 3, 4 and/or 5 can be made by dissolving these compounds in a mixture of water and lower alcohols.

EXAMPLE 1

12% tallow fatty acid-amidopropyl-N,N-dimethyl-N-carboximethyl-betaine
5% adipic acid
10% isobutanol
5% methanol
water ad 100%

EXAMPLE 2

12% tallow fatty acid-amidopropyl-N,N-dimethyl-N-carboximethyl-betaine
3% $SO_2$
10% isobutanol
5% methanol
water ad 100%

EXAMPLE 3

8% tallow fatty acid-amidopropyl-N,N-dimethyl-N-carboximethyl-betaine
10% isobutanol
5% methanol
15% mixture of alkyl pyridines
5% $SO_2$
water ad 100%

EXAMPLE 4

10% tallow fatty acid-amidopropyl-N,N-dimethyl-N-carboximethyl-betaine
5% cocosdiamine+15 moles ethylene oxide
10% isobutanol
5% methanol
water ad 100%

EXAMPLE 5

12% tallow fatty acid-amidopropyl-N,N-dimethyl-N-carboximethyl-betaine

5% compound of formula 5
85% mixture of propylene glycol and isobutanol

EXAMPLE 6

12% N-cocoalkylaminopropionic acid
5% sebacic acid
15% butylglycol
water ad 100%

In the examples described before all percentages are by weight.

These compositions have been checked in a standard corrosion inhibitor test, referred to as a bubble test. In the presence of 80% brine and 20% crude oil, saturated with carbon dioxide, in a 24 hour test gave greater than 90% protection, when measured by Corrator, at a treatment rate of 20 ppm. The same products in a dynamic autoclave test with 3% sodium chloride, 10 bars of carbon dioxide pressure, 12° C., containing 8 steel coupons, rotating at about 3 meter per second gave 60% protection. There are a number of commercial inhibitors on the market, that give 40% or less protection, others give greater than 90% protection. Therefore, the compositions as described above are within the range of commercial corrosion inhibitors. These compositions have also been tested for growth inhibition of Skeletonrema Costatum, a standard toxicity test for marine diatomes, at a treating rate of 4 ppm and there was no appearent retardation of growth of the Skeletonrema Costatum up to 4 ppm and some at 8 ppm.

I claim:

1. Process for inhibiting corrosion in oil production fluids which process consists in adding to the oil production fluids an effective amount of a betaine or ampholyte of the formulas 1 or 2

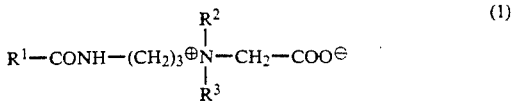

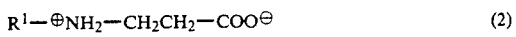

wherein $R^1$ is $C_{10}$–$C_{20}$-alkyl or $C_{10}$–$C_{20}$-alkenyl, and $R^2$ and $R^3$ are $C_1$-$C_4$-alkyl.

2. Process as claimed in claim 1 which consists in adding 5 to 300 ppm of the betaine or ampholyte of formula 1 to the oil production fluids.

3. Process as claimed in claim 1 which consists in using the betaine or ampholyte of formulas 1 or 2 together with oxalkylated fatty amines of formulas 3 or 4

wherein $R^1$ is as defined for formula 1 and X is a number from 5 to 15 and/or a compound of the formula 5

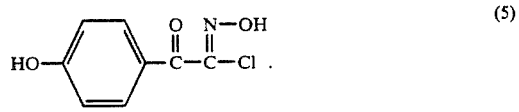

* * * * *